United States Patent [19]

Klein et al.

[11] 4,404,121

[45] Sep. 13, 1983

[54] PROCESS FOR PREPARING POLYOL-CATALYST MIXTURES USEFUL IN THE PREPARATION OF RIGID POLYURETHANE CELLULAR PRODUCTS

[75] Inventors: Howard P. Klein, Houston; George P. Speranza, Austin, both of Tex.

[73] Assignee: Texaco Inc., White Plains, N.Y.

[21] Appl. No.: 335,947

[22] Filed: Dec. 30, 1981

[51] Int. Cl.³ .............................................. B01J 31/02
[52] U.S. Cl. ..................................... 252/426; 521/115
[58] Field of Search ......................................... 252/426

[56] References Cited

U.S. PATENT DOCUMENTS 2,779,689  1/1957  Reis .......................................... 521/78
2,981,700  4/1961  Parker et al. .......................... 521/129
3,297,597  1/1967  Edwards et al. ..................... 521/166
3,892,687  7/1975  Bechara et al. ...................... 252/426

*Primary Examiner*—Maurice J. Welsh
*Attorney, Agent, or Firm*—Jack H. Park; Kenneth R. Priem; David L. Mossman

[57] ABSTRACT

Polyol-catalyst mixtures, useful in the preparation of rigid polyurethane cellular products, are prepared simultaneously by reacting a Mannich base compound, water, and an epoxide and subsequently removing the water from the reaction mixture. Also provided are new rigid polyurethane cellular products having a high content of isocyanurate linkages, superior heat distortion temperatures and improved insulating properties, which products are obtained by reacting a polyisocyanate with the aforementioned polyol-catalyst mixture.

9 Claims, No Drawings

PROCESS FOR PREPARING POLYOL-CATALYST MIXTURES USEFUL IN THE PREPARATION OF RIGID POLYURETHANE CELLULAR PRODUCTS

BACKGROUND OF THE INVENTION

1. Field of the Invention

This invention relates to a new process for preparing polyol-catalyst mixtures. More particularly, the invention relates to a new process for preparing polyol-catalyst mixtures which are useful in the preparation of improved rigid polyurethane cellular products.

Specifically, the invention provides a new process for simultaneously preparing a polyol-catalyst mixture which can be used to produce improved rigid polyurethane cellular products, which process comprises reacting a Mannich base compound, water and an epoxide, such as ethylene oxide, together at an elevated temperature, and subsequently removing the water from the reaction mixture. The invention further provides new and valuable polyurethanes, and particularly new rigid polyurethane cellular products having a high content of isocyanurate linkages, improved heat distortion temperatures and improved insulating properties, which products are prepared by reacting the aforementioned polyol-catalyst mixture with a polyisocyanate.

2. Description of the Prior Art

It is known to prepare rigid polyurethane foams by the reaction of a polyisocyanate with a hydroxyl-terminated polyester, polyether or polyamine, which generally have hydroxyl numbers within the range of from about 350 to 900. However, to date no ideal polyol has been found and, for various reasons, polyurethane foams prepared from such polyols have not been entirely satisfactory.

Still further, the production of a satisfactory urethane foam requires that the relative rates of the various reactions that occur be properly balanced. This balance is normally obtained by careful selection of a catalyst system. The catalyst usually consists of a tertiary amine used alone or, when necessary, mixed with organic tin compounds in a manner well known to those skilled in the art. The tertiary amines so employed will normally impart an objectionable odor to the final foam product.

U.S. Pat. No. 3,297,597 proposes the use of certain nitrogen-containing polyols which act both as a polyol and a catalyst in the reaction with the polyisocyanates. This avoids some of the difficulties noted above, such as the odor of the amine catalyst, but still retains some of the limitations of the prior known products, such as limited heat resistance, limited compatibility and limited isocyanurate linkages retained in the cured product.

It is an object of the invention, therefore, to provide a new process for preparing polyol-catalyst mixtures useful in the preparation of polyurethane foams. It is a further object to provide a process for preparing new polyol-catalyst mixtures which impart many improvements to the preparation of rigid polyurethane cellular products. It is a further object to provide new polyol-catalyst mixtures for polyurethane foam preparation which permit the production of products having a higher number of isocyanurate linkages. It is a further object to provide new polyol-catalyst mixtures for polyurethane production which permits slower and more desirable reaction. It is a further object to provide new polyol-catalyst mixtures which give polyurethane foamed products having improved heat resistance and insulation properties. It is a further object to provide new polyol-catalyst mixtures which have better compatibility with the reaction components. It is a further object to provide new polyol-catalyst mixtures which are simple and economical to prepare. These and other objects of the invention will be apparent from the following detailed description thereof.

SUMMARY OF THE INVENTION

It has now been discovered that these and other objects may be accomplished by the new polyol-catalyst mixtures of the present invention which are prepared in good yield by reacting a Mannich base compound, water and an epoxide, such as ethylene oxide, together at an elevated temperature, and then removing the water from the reaction mixture. It was surprising to find that polyol-catalyst mixtures having superior properties could be obtained by this straightforward economical process. It was found, for example, that the new polyol-catalyst mixtures formed in this manner had excellent compatibility with the ingredients used in the formation of polyurethane foams. In addition, the new polyol-catalyst mixtures permit better control over the rate of reaction and yielded improved products. The products so prepared, for example, have a higher number of isocyanurate linkages and greatly improved heat resistance properties as well as excellent insulating properties. The production of products having these improved properties is illustrated in the examples at the end of the specification.

DETAILED DESCRIPTION OF THE INVENTION

The process for producing the new polyol-catalyst mixtures having the improved properties is made up of the following steps:

(a) mixing a Mannich base compound, water and an epoxide, such as ethylene oxide, together in a reaction chamber and heating the mixture to a temperature below about 150° C. and, (b) subsequently stripping the water from the reaction mixture.

The process for using the above noted polyol-catalyst mixtures in the preparation of improved rigid polyurethane cellular products comprises reacting the said polyol-catalyst mixture with the desired polyisocyanate and other components, such as blowing agent, stabilizer, fire-retardant, etc. in the desired proportions.

In order to present the inventive concept of the present invention in the greatest possible detail, the following supplementary disclosure is submitted.

The Mannich base used in the preparation of the new polyol-catalyst mixtures are prepared by reacting a phenolic compound with formaldehyde and an alkanolamine. The Mannich reaction is conducted by premixing the phenolic compound with a desired amount of the alkanolamine and then slowly adding formaldehyde to the mixture at a temperature below the temperature of Novolak formation (a temperature that will vary with the phenolic compound employed and is a temperature of less than about 35° C. when phenol itself is employed). At the end of the formaldehyde addition, the reaction mixture is slowly heated with agitation to a temperature of at least about 50° C. such as a temperature within the range of about 80° C. to 150° C. for a period of time sufficient to reduce the formaldehyde content to at least about 1 wt percent. This will normally require from about two to about four hours reaction time at the elevated temperature.

The phenolic compound to be employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituents which are nonreactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500. Examples of acceptable phenolic compounds include, among others, o-, m-, or p-cresols, ethylphenol, nonylphenol, p-phenylphenol, 2,2-bis(4-hydroxyphenyl)propane, beta-naphthol, beta-hydroxyanthracene, p-chlorophenol, o-bromophenol, 2,6-chlorophenol, p-nitrophenol, 4-nitro-6-phenylphenol, 3,5-dimethylphenol, p-isopropylphenol, 2-bromo-4-cyclohexylphenol, 2-(4-hydroxyphenyl)ethanol, and 4-chlorophenol.

The alkanolamine to be reacted with the phenolic compound and formaldehyde in accordance with the method of making the Mannich bases is an alkanolamine and preferably those of the formula

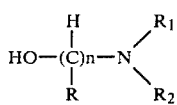

wherein R is hydrogen or an alkyl radical preferably containing 1 to 4 carbon atoms, at least one $R_1$ or $R_2$ is hydrogen and the remaining $R_1$ or $R_2$ is hydrogen or a hydrocarbon or substituted hydrocarbon radical and n is an integer, preferably 2 to 6.

Examples of suitable alkanolamines that may be used are monoethanolamine, diethanolamine, isopropanolamine, bis(2-hydroxypropyl)amine, hydroxyethylmethylamine, N-hydroxyethylpiperazine, N-hydroxybutylamine, N-hydroxyphenyl-2,5-dimethylpiperazine, etc.

Formaldehyde may be employed in the Mannich reaction in any of its conventional forms, such as an aqueous formalin solution, an inhibited methanol solution, paraformaldehyde, or trioxane.

The proportions of reactants used in making the Mannich bases may vary over a wide range depending upon the type of product desired. For example, if phenol, diethanolamine and formaldehyde are employed in a molar ratio of 1:3:3, the predominant product will have seven hydroxyl groups attached to a single molecule. If the molar ratio of these same reactants is changed to 1:2:2, a pentol will be obtained as the predominant product. Similarly, when the molar ratio is 1:1:1, a triol is the predominant product. If an excess of formaldehyde is used in preparing the triol or pentol, the Mannich reaction becomes complex due to the secondary condensation of phenol with formaldehyde.

The Mannich products possess a plurality of hydroxy-terminated side chains available for further reaction with the epoxide. The preferred Mannich products may be represented by the following formula

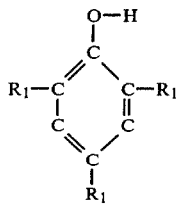

wherein the $R_1$'s represent hydrogen or a —$CH_2N(X-OH)_2$ radical wherein X is an alkylene radical containing up to 8 carbon atoms. The product prepared from phenol, diethanolamine and formaldehyde in a 1:3:3 ratio may be represented by the formula

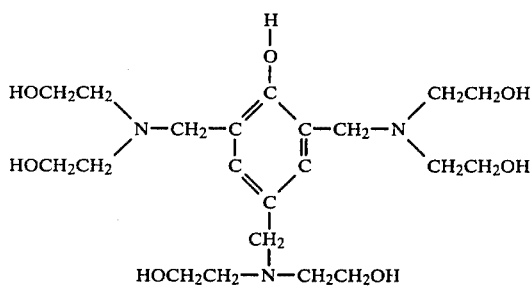

The exact structure of the Mannich bases will depend upon the proportion of reactants employed but they will all possess a plurality of active hydroxy-terminated side chains. A detailed description of the preparation of suitable Mannich bases may be found in U.S. Pat. No. 3,297,597.

As noted in U.S. Pat. No. 3,297,597, water is formed in the reaction and in that particular case, special care is taken to remove the water as noted in col. 2, line 34 of that patent. However, in the present process, the water is not removed but retained in the reaction to participate in the reaction with the alkylene oxide. For desired results, the amount of water to be retained in the reaction mixture should be at least 2% by weight, and preferably between 5% and 25% by weight.

As noted above, the new polyol-catalyst mixtures are obtained by reacting the above-noted Mannich bases with water and an epoxide, and preferably an alkylene oxide. The epoxide to be used include the mono- and polyepoxides, and particularly those of the formula

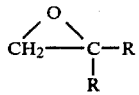

wherein both Rs can be hydrogen or an organic radical, preferably containing up to 12 carbon atoms. Examples of the epoxides include, among others, butadiene monoepoxide, epichlorohydrin, styrene oxide, ethylene oxide, propylene oxide, butylene oxide, cyclohexeneoxide, epoxypropylbenzene, epoxypropylnapthalene, 1,2,5-triepoxypropylbenzene, and the like, and mixtures thereof. Particularly preferred are the aliphatic monoepoxides containing 2 to 8 carbon atoms, such as ethylene oxide, propylene oxide, butylene oxide, amylene oxide.

The amount of the epoxide to be used in the preparation process may vary over a wide range. In general, the amount of the alkylene oxide may vary from about 1 to 10 times the amount of the Mannich base, but should be sufficient to react with a majority of the —XOH groups in the Mannich base. Preferably the epoxide is employed in amounts varying from about 2 to 6 moles per mole of Mannich base.

The Mannich base, water and epoxide can be combined in any order but it is generally preferred to add the epoxide to the reaction mixture containing the Mannich base and water. Temperatures employed in the process may vary within a wide range. In general, it is desirable to maintain the temperature below about 150° C., and more preferably between about 90° C. and 125° C. Atmospheric, superatmospheric or subatmospheric pressures may be utilized as desired or necessary.

The heat is continued until the desired polyol-catalyst mixture is obtained. In general, this is accomplished with reaction periods varying from about 0.5 hour to about 3 hours, depending upon the nature of the reactants and the temperature employed.

At the conclusion of the reaction, the water and other low molecular weight products such as excess epoxide are stripped from the reaction mixture. This is preferably accomplished by distillation under high vacuum.

The polyol-catalyst mixtures prepared by the above process may be recovered as liquids or soft solids. They will preferably have a hydroxyl number varying from about 300 to 1000, an amine content varying from 2 to 3 meg/g., color as determined by the Gardner scale of about 8 to 15 and a pH varying from about 10 to about 12.5.

As noted above, the new polyol-catalyst composition produced as above are particularly valuable in the reaction with isocyanates to form polyurethanes or polyisocyanurates. They are particularly outstanding in the reaction with polyisocyanates to form rigid cellular polyurethanes that have greatly improved properties. In this reaction they are combined with desired polyisocyanate and other components generally used in the formation of cellular products, such as blowing agents, fire retardants, stabilizers, etc., and the reaction effected by use of known techniques.

The polyisocyanates to be used in making the foams of the present invention include those compounds containing at least two isocyanate groups per molecular, such as, for example, tolylene diisocyanate (TDI), hexamethylenediisocyanate, chlorophenyldiisocyanate, bromophenyldiisocyanate, tetraisocyanatodiphenylmethane, 3,3'-dichloro-4,4'-biphenyldiisocyanate, diphenyl diisocyanate, ethylene diisocyanate, propylene 1,2-diisocyanate, 1,4-tetramethylene diisocyanate, p-phenylene diisocyanate, polymethylene polyphenylisocyanate, and mixtures thereof. Preferred polyisocyanates include the organic aromatic, aliphatic or cycloaliphatic polyisocyanates. Coming under special consideration are the prepolymers obtained by reacting active hydrogen containing compounds, such as alcohols or amines with excess polyisocyanates, which polymers contain a plurality of free isocyanate groups such as from 3 to 8 such groups.

Also of special consideration are the aromatic polyisocyanates such as, for example, 2,4- and 2,6-toluene diisocyanates and methylene-bridged polyphenyl polyisocyanate mixtures which have a functionality of from about 2 to about 4. These latter isocyanates compounds are generally produced by the phosgenation of corresponding methylene-bridged polyphenyl polyamines. Most preferred methylene-bridged polyphenyl polyisocyanates mixtures contain about 20 to 100 weight percent methylene diphenyldiisocyanate isomer, with the remainder being polymethylene polyphenyl polyisocyanates having higher functionality and higher molecular weights.

The most commonly used foam stabilizers are silicone oils, usually silicone-glycol copolymers such as those prepared in accordance with the disclosure of U.S. Pat. No. 2,834,748. Such materials have the formula

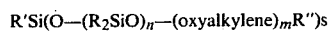

wherein R, R' and R" are alkyl groups containing 1 to 4 carbon atoms, n is 4 to 8, m is 20 to 40, and the oxyalkylene groups are derived from ethylene and propylene oxides or mixtures thereof.

Blowing agents used to prepare rigid urethane foams are generally volatile liquids such as, for example, trichlorofluoromethane.

Fire retardants that can be incorporated in the foaming mixture are of two types, those that are incorporated by mere mechanical mixing and those that become chemically bound in the polymer chains. The most commonly used of the first type are tris(chloroethyl) phosphate and tris(chloropropyl) phosphate. The second type of fire retardant offers another approach to the problem of fire retarding foams. Examples of this type include chlorendic acid derivatives, terephthalate derivatives, and various phosphorus-containing polyols.

While the new cellular polyurethane products of the present invention are obtained by using the new polyol-catalyst mixtures produced above, it may be desirable at times to modify the product by including other types of polyols and catalysts. For example, it may be desirable to include other known catalysts for this reaction, such as, for example, polyamines, tin octoate, dibutyl tin dilaurate, n-alkyl morpholines, diazabicyclooctane, and the like. Other polyols that may be included inclose those possessing at least 2 to 6 hydroxyl groups. Suitable examples include, among others polyethylene glycol, polyesters as glycol-terephthalate, glycol-succinate, tetramethyleneglycol-adipate or other hydroxy-terminated linear esters. Other polyols may be glycerol, 1,2,6-hexanetriol, 1,3,6-octanetriol, a polyethylene ether derivative of glycerol or 1,2,6-hexanetriol, erythritol, pentaerythritol, mannitol, sorbitol, alpha-methyl glucose and sucrose. Other polyols include those prepared by reacting an alkylene oxide such as ethylene oxide, propylene oxide, 1,2-butylene oxide, styrene oxide, epichlorohydrin, glycidol and mixtures thereof with a polyhydric alcohol such as carbohydrates, glycerol, hexanetriol, petaerythritol sorbitol, methyl glucoside, sucrose, and the like. In addition, alkylene oxide adducts of certain amines, such as, for example, any of the aforementioned oxides with amines such as ethylene diamine, aminoethylpiperazine, etc. may also be used. Hydroxy-terminated polyesters are also useful in preparing the products of the invention. These include those prepared by reacting dibasic acids such as adipic acid, phthalic acid, terephthalic acid, and diols or triols, such as diethylene glycol, glycerol, trimethylpropane and the like.

Preferred polyols to be used include those obtained by reacting polyalkylene oxides with polyhydric alcohols, the polyols obtained by reacting the alkylene oxides with polyamines and the polyols obtained by reacting polybasic acids with polyhydric alcohols to form hydroxy-terminated products.

The selection of the reactant components will vary depending upon the type of product desired. In general when a flexible cellular product is desired, the polyols should preferably have a functionality of from about 2 to 4 and a molecular weight of about 2000 to 6000. For rigid foams, the functionality of the polyol is preferably from about 4 to 8 and a molecular weight of about 300 to about 1200. For polyisocyanurate foams the functionality of the polyol is preferably from about 2 to 8 and the molecular weight varies from about 105 to 1000.

The amount of the polyisocyanate and the polyol-catalyst mixture to be used in making the polyurethane cellular products of the present invention may vary over a wide range. In general, the amount of the polyisocyanate should be sufficient to react with all of the OH groups present in the polyol portion of the mixture and preferably in excess thereof. More preferably there is about 1 to 8 equivalents of the isocyanate groups per equivalent of OH groups. As noted above, an unexpected advantage of the use of the new polyol-catalyst systems includes their ability to bring about the incorporation of much larger amounts of isocyanurate linkages than possible heretofore. Coming under special consideration then would be the use of larger amounts of the isocyanates, such as, for example, from 2 to 5 equivalents of isocyanate groups per equivalent of OH.

When the polyol-catalyst mixture is added in the amount described above, the amount of catalyst present is sufficient to effect the desired rapid reaction.

Foams may be prepared by the so-called "one-shot" method or the "quasi-prepolymer" method. In the one-shot method, the ingredients are simultaneously intimately mixed with each other to provide a foam by a one-step process. In accordance with the quasi-prepolymer method, a portion of the polyol compound is reacted in the absence of the catalyst with the polyisocyanate component. To prepare a foam, the remaining portion of the polyol is added and the two components are allowed to react in the presence of catalystic systems such as those discussed above and other appropriate additives. Usually a flexible foam is prepared by the one-shot method whereas rigid foams may be produced by that method or the quasi-prepolymer method. Polyurethane or polyisocyanurate elastomers, coatings, solid polymers, etc. may also be prepared by known techniques.

The polymers prepared with the new polyol-catalysts may be used for a wide variety of end-uses. For example, the rigid, flexible, semi-flexible or semi-rigid type of polyurethane or polyisocyanurate foams may be used for thermal insulation and as building materials and the like. As specific examples, the cellular products of the invention can be employed as thermal barriers in the construction of fire walls, in the building of industrial and institutional structures, and an insulating materials for high temperature pipelines and ovens, in supersonic aircraft and also as missile components.

To illustrate the preparation of the new polyol-catalyst compositions and the new cellular products, the following examples are given. It is to be understood, however, that the examples are given only in the way of illustration and are not to be regarded as limiting the invention in any way.

EXAMPLE I

To a 5-gallon kettle was added 10.0 lbs (0.0167 lb. mole) of an aqueous (24% water) Mannich base condensate, which was prepared from nonylphenol, diethanolamine and aqueous 37% formaldehyde as described in U.S. Pat. No. 3,297,597. The condensate solution was heated to 110° C. to 115° C. and 6.0 lb (0.103 lb mole) propylene oxide was added. After digesting the reaction mixture to constant pressure a water analysis gave 14.4% water present. An additional 1.0 lb propylene oxide was added, and after digestion showed a water concentration of 11.4%. The water and excess oxide were finally vacuum stripped to 5 mmm Hg/110° C. to give 14.25 lb of a dark red product, having the following analysis:

| | |
|---|---|
| Hydroxyl number, mg. KOH/g. | 638 |
| Total amine, meg./g. | 2.3 |
| Viscosity (25° C.), cps | 3,500 |
| Color (Gardner) | 10–11 |
| pH (25% isopropanol:water) | 10.6 |

EXAMPLE II

To a 15 gallon reactor kettle was added 22.0 lb (0.10 lb mole) of p-nonylphenol and 22.0 lb (0.21 lb mole) diethanolamine. Then 17.0 lb (0.21 lb mole) 37% aqueous formalin was added slowly while the kettle temperature was maintained between 30° and 40° C. After all the formalin was added the kettle was heated to 110° C. and the reaction mixture digested for four hours. After this period, the water concentration was 23.9%.

While heating at 110° C. to 115° C., 35.0 lb (0.60 lb mole) propylene oxide was slowly added. After a digestion period of two hours, the water concentration was 7.5%. Water and excess oxide were removed by vacuum stripping to 8 mm Hg/110° C. The product was a dark red liquid. Yield was 82 lbs.

| Analysis: | |
|---|---|
| Hydrogen number, mg. KOH/g. | 611 |
| Total amine, meg./g. | 2.50 |
| Viscosity, cps (25° C.) | 6,450 |
| Wt % water | 0.02 |
| Color (Gardner) | 12–13 |
| pH | 10.7 |

EXAMPLE III

The procedure of Example II was used; however, the aqueous Mannich condensate was prepared by admixing 11.0 lb, p-nonylphenol, 11.0 lb diethanolamine and 8.5 lb 37% formalin, followed by a three hour digestion period at 110° C.

The aqueous condensate was heated at 110° C. while 13.5 lb (0.307 lb mole) ethylene oxide was added. After digesting for one hour at 110° C. the mixture was stripped to a water concentration of 0.03%. Yield was 36.3 lb of dark red, slightly viscous liquid.

| Analysis: | |
|---|---|
| Hydroxyl no., mg. KOH/g. | 557 |
| Total amine, meg/g. | 2.84 |
| Viscosity (25° C.), cps | 7,900 |
| Color (Gardner) | 13–.4 |
| pH (25% isopropanol:water) | 12.1 |

EXAMPLE IV

To a 15-gallon kettle was added 14.9 lbs (0.10 lb mole) triethanolamine (99%) and 3.6 lb water. The resulting mixture was heated up to 110° to 115° C. under nitrogen while 23.2 lbs (0.40 lb mole) propylene oxide was slowly added. After a two hour digestion period at 10° C. to 115° C. the water concentration was 6.28%.

The product was stripped in high vacuum to remove 4 to 5 lbs water and oxide. Yield was 38.0 lb of light, red-brown mobile liquid.

| Analysis: | |
|---|---|
| Hydroxyl No. | 580 |
| Total amine | 5.4 |
| Viscosity (25° C.), cps | 300 |
| Wt, % water | 0.03 |
| Color | 6-7 |
| pH | 11.2 |

EXAMPLE V

The procedure of Example II was repeated. However, the aqueous Mannich condensate was prepared by reacting 26.4 lbs p-nonylphenol, 26.4 lbs diethanolamine and 20.2 lbs of 37% aqueous formaldehyde at 95°–100° C. for about five hours.

While heating at 100° C. the above condensate mixture was reacted with 33.0 lb ethylene oxide and digesting to constant pressure over a one hour period. After vacuum stripping the mixture down to 5 mm Hg/100° C. 87.3 lbs of a dark-red viscous product was obtained.

| Analysis: | |
|---|---|
| Hydroxyl no. | 575 |
| Total amine | 2.8 |
| Viscosity (25° C.) | 7,900 |
| Wt % water | 0.16 |
| Color (Gardner) | 12-13 |
| pH (isopropanol:water) | 12.1 |

EXAMPLE VI

To a 15-gallon reactor kettle was added 15.0 lb (0.10 lb mole) p-tertbutylphenol and 22.0 lb diethanolamine. Then 17.0 lb (0.21 mole) of 37% aqueous formaldehyde was added. After a four hour digestion period at 100°–110° C., the water concentration was 23.4%.

The aqueous condensate was heated at 110° C. while 35.0 lb (0.60 lb mole) propylene oxide was added slowly. After a one hour digestion period at 110° C. the water concentration was 10.6%.

The above mixture was finally vacuum stripped to 10 mm Hg/100° C. to give 74.6 lb of red, viscous liquid polyol.

| Analysis: | |
|---|---|
| Hydroxyl number | 640 |
| Total amine | 2.76 |
| Viscosity, cps (25° C.) | 6,800 |
| Water, wt % | 0.052 |
| Color (Gardner) | 10-11 |
| pH (25% isopropanol:water) | 10.3 |

EXAMPLE VII

To a one-liter stirred autoclave was added 195 g (1.0 mole) N-benzyldiethanolamine and 72 g (4.0 mole) water. The mixture was heated to 100°–110° C. and 174 grams (3.0 moles) propylene oxide was added. After a short digestion period, the mixture was stripped in high vacuum to remove water and give 385 g. light yellow product.

| Analysis: | |
|---|---|
| Hydroxyl number | 544 |
| Total amine | 2.38 |
| Viscosity (25° C.) cps | 1,620 |
| Wt. % water | 0.08 |
| Color (Gardner) | 9-10 |
| pH (25% isopropanol/water) | 10.2 |

EXAMPLE VIII

The polyol-catalyst composition prepared in Example I was used to prepare a rigid foam. This was accomplished by adding 33.5 parts of the polyol to 53.5 parts of Mondur MR, 0.5 parts silicone DC-193, 12.5 parts of fluorocarbon-11. The properties of the resulting foam are shown in Table I. Components used in the reaction are identified as follows:

Thanol TR-380—an ethylene oxide adduct of aniline, see U.S. Pat. No. 4,067,833
Trichloroethyl phosphate
Silicone DC-193—silicone-glycol copolymer
Freon R-11-B—trifluorochloromethane
Mondur MR—mixture of 50% diphenylmethane diisocyanate and 50% higher polymers of similar structure, has a 32% NCO content and equivalent weight of 132

EXAMPLES IX to XIV

The polyol-catalyst mixtures prepared in Examples I, 3, 4, 5, 6 and 7 were used to prepare rigid polyurethane foams. The conditions and results are shown in Table I.

As can be seen, the use of the new polyol-catalyst mixtures gave products having high isocyanate indices, excellent heat temperatures and good insulation properties. In addition, there was excellent compatibility of the polyol-catalyst mixtures with the other ingredients and the rate of reaction could be easily controlled. The polyol-catalyst mixtures also imparted no amine odor to the final product.

TABLE NO. I

| | RIGID FOAM DATA | | | | | |
|---|---|---|---|---|---|---|
| | Ex. VIII | Ex. IX | Ex. X | Ex. XI | Ex. XII | Ex. XIII |
| Formulation, pbw. | | | | | | |
| Polyol Ex. 1 | 33.5 | 33.5 | 21.4 | 16.7 | — | — |
| Polyol Ex. 3 | — | — | — | — | 8 | 7 |
| THANOL ® TR-380 | — | — | — | — | 12 | 13 |
| Tri(chloroethyl)phosphate | — | — | — | 6.0 | — | — |
| Silicone DC-193 | 0.5 | 0.5 | 0.5 | 0.5 | 0.5 | 0.5 |
| Freon R-11-B | 12.5 | 12.5 | 12.5 | 12.5 | 12.5 | 12.5 |

TABLE NO. I-continued
RIGID FOAM DATA

| | Ex. VIII | Ex. IX | Ex. X | Ex. XI | Ex. XII | Ex. XIII |
|---|---|---|---|---|---|---|
| Mondur MR | 53.5 | 53.5 | 65.6 | 64.3 | 67.0 | 67.0 |
| Isocyanate Index | 1.05 | 1.05 | 2.0 | 2.5 | 3.5 | 3.6 |
| Butler Chimney Test | | | | | | |
| Flame height, inches | — | — | — | — | 6.33 | 6.5 |
| Time (sec.) to extinguish | — | — | — | — | 10.83 | 10.5 |
| % weight retained | — | — | — | — | 92.7 | 92.8 |
| Foam Appearance | Good | Good | Good | Good | Good | Good |
| Initial Surface Friability | None | V. slight | Yes | V. slight | V. slight | Slight |
| Reaction rate | | | | | | |
| Cream time, sec. | 27 | 27 | 30 | 36 | 9 | 16 |
| Tack free time, sec. | 50 | 50 | 70 | 75 | 35 | 45 |
| Rise time, sec. | 85 | 75 | 120 | 110 | 55 | 68 |
| Physical Properties | | | | | | |
| Density, pcf. | 1.92 | 1.99 | 2.02 | 2.00 | 2.13 | 2.10 |
| Comp. str., psi. parallel | 45.20 | 43.74 | 38.46 | 34.52 | 37.76 | 36.08 |
| perp. | 17.40 | 19.22 | 14.86 | 13.53 | 12.47 | 12.15 |
| Heat dist. temp., °C. | 180 | 187 | 211 | 195 | >225 | >225 |
| Closed cells % | 94.41 | 92.20 | 92.62 | 90.74 | 91.95 | 91.32 |
| K-factor | 0.114 | 0.126 | 0.126 | 0.126 | 0.119 | 0.126 |
| Dimensional stability | ΔV ΔW ΔL | ΔV ΔW ΔL | ΔV ΔW ΔL | ΔV ΔW ΔL | ΔV ΔW ΔL | ΔV ΔW ΔL |
| 1 week −20° F. | −2 +1 −1 | −3 +1 −2 | −4 0 −2 | −2 0 −2 | −4 +1 −2 | −3 +1 −2 |
| 1 week 200° F. | +4 −1 +2 | +2 −1 +2 | +3 −1 +2 | +3 −3 +2 | +5 −2 +3 | +6 −2 +3 |
| 1 week 158° F., 100% R.H. | +4 −2 +3 | +2 −1 +1 | +2 −2 +1 | +3 −4 +3 | +4 −3 +3 | +5 −4 +3 |
| Tumbling friability (% wt. loss) | 9.4 | 24.6 | 25.2 | 44.2 | 31.7 | 30.3 |

TABLE NO. II

| | Ex. XIV | Ex. XV | Ex. XVI | Ex. XVII | Ex. XVIII | Ex. XIX |
|---|---|---|---|---|---|---|
| Formulation, pbw. | | | | | | |
| Polyol (Ex. IV) | 20.0 | — | — | — | — | — |
| Polyol (Ex. V) | — | 10 | — | — | — | — |
| Polyol (Ex. II) | — | — | 20 | — | — | — |
| Polyol (Ex. VI) | — | — | — | 20 | 17.4 | — |
| Polyol (Ex. VII) | — | — | — | — | — | 20.0 |
| THANOL ® TR-380 | — | 10 | — | — | — | — |
| Tri(chloroethyl)phosphate | — | — | — | — | 6.0 | — |
| Silicone DC-193 | 0.5 | 0.5 | 0.5 | 0.5 | 0.5 | 0.5 |
| Freon R-11-B | 12.5 | 12.5 | 12.5 | 12.5 | 12.5 | 12.5 |
| Mondur MR | 67.0 | 67.0 | 67.0 | 67.0 | 63.6 | 67.0 |
| Isocyanate Index | 2.4 | 2.65 | 2.3 | 2.2 | 2.4 | 2.6 |
| Butler Chimney Test | | | | | | |
| Flame height, inches | — | 5.25 | — | — | 6.3 | — |
| Time (sec.) to extinguish | — | 10 | — | — | 13.3 | — |
| % weight retained | — | 93.6 | — | — | 89.3 | — |
| Foam Appearance | Poor | Good | Good | Good | Good | Poor |
| Initial Surface Friability | Shrunk | V. slight | Yes | Yes | None | Shrunk |
| Reaction Rate | | | | | | |
| Cream time, sec. | 32 | 6 | 30 | 30 | 25 | 67 |
| Tack free time, sec. | 190 | 21 | 60 | 67 | 62 | — |
| Rise time, sec. | 134 | 40 | 90 | 105 | 100 | — |
| Physical Properties | | | | | | |
| Density, pcf. | | 2.05 | 2.00 | 2.02 | 1.97 | |
| Comp. str., psi. parallel | | 35.54 | 38.28 | 41.22 | 26.51 | |
| perp. | | 11.78 | 15.01 | 16.10 | 19.1 | |
| Heat dist. temp., °C. | | >225 | 215 | 220 | 200 | |
| Closed cells % | | 92.1 | 92.6 | 93.0 | 89.0 | |
| K-factor | | 0.120 | 0.129 | 0.123 | 0.158 | |
| Dimensional stability | | ΔV ΔW ΔL | ΔV ΔW ΔL | ΔV ΔW ΔL | ΔV ΔW ΔL | |
| 1 week −20° F. | | −12 +1 +8 | −3 +1 −2 | −2 0 −2 | 0 +1 0 | |
| 1 week 200° F. | | +8 −1 +5 | +4 −1 +2 | +4 −1 +2 | +5 +3 +3 | |
| 1 week 158° F., 100% R.H. | | +8 −2 +5 | +3 −1 +2 | +2 −3 +2 | +3 −5 +4 | |
| Tumbling friability (% wt. loss) | | 23.8 | 43.8 | 27.5 | 64.1 | |

What is claimed is:

1. A process for preparing polyol-catalyst mixtures useful in the preparaton of rigid polyurethane cellular products which comprises heating a Mannich base compound with water and an epoxide and subsequently removing the water from the reaction mixture, said Mannich base compound being the reaction product of a phenol, an alkanolamine and formaldehyde.

2. A process as in claim 1 wherein the Mannich base is a reaction product of an alkylphenol, dialkanolamine and formaldehyde.

3. A process as in claim 1 wherein the epoxide is an alkylene oxide.

4. A process as in claim 1 wherein the epoxide is an alkylene oxide of the group consisting of ethylene oxide, propylene oxide, butylene oxide and amylene oxide.

5. A process as in claim 1 wherein the Mannich base is the reaction product of a phenol, an alkanolamine and formaldehyde wherein the components are utilized in a ratio varying from 1:1:1 to 3:3:3.

6. A process as in claim 1 wherein the alkanolamine is diisopropanolamine.

7. A process as in claim 1 wherein the phenol is nonylphenol.

8. A process for preparing a polyol-catalyst mixture for use in the preparation of rigid polyurethane cellular products which comprises reacting a Mannich base compound with water and alkylene oxide at a temperature between 50° C. and 150° C. until the desired polyol-catalyst mixture has been formed and then stripping out the water, said Mannich base compound being the reaction product of a phenol, an alkanolamine and formaldehyde.

9. A polyol-catalyst mixture prepared by the process of claim 1.

* * * * *